(12) United States Patent
Rozzi et al.

(10) Patent No.: US 8,140,196 B2
(45) Date of Patent: Mar. 20, 2012

(54) METHOD OF CONTROLLING TEMPERATURE OF A COMPUTER SYSTEM

(75) Inventors: James A. Rozzi, Houston, TX (US); Peter Hansen, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 934 days.

(21) Appl. No.: 12/153,124

(22) Filed: May 14, 2008

(65) Prior Publication Data

US 2008/0306634 A1 Dec. 11, 2008

Related U.S. Application Data

(60) Provisional application No. 60/942,237, filed on Jun. 6, 2007.

(51) Int. Cl.
G05D 23/00 (2006.01)
G06F 1/20 (2006.01)

(52) U.S. Cl. ............ 700/300; 318/473; 361/679.48

(58) Field of Classification Search .......... 700/276, 700/299, 300, 304; 388/811, 907.5, 934; 318/471–473; 361/679.46–679.54, 688–697
See application file for complete search history.

(56) References Cited

U.S. PATENT DOCUMENTS

| | | | | |
|---|---|---|---|---|
| 4,817,865 A * | 4/1989 | Wray | ............ | 236/49.3 |
| 6,101,459 A * | 8/2000 | Tavallaei et al. | ............ | 702/132 |
| 7,064,511 B2 * | 6/2006 | Marando et al. | ......... | 318/400.08 |
| 7,235,943 B2 * | 6/2007 | Hsiang et al. | ............ | 318/471 |
| 7,401,644 B2 * | 7/2008 | Ziarnik et al. | ............ | 165/287 |
| 7,426,109 B2 * | 9/2008 | Lindell et al. | ............ | 361/679.48 |
| 7,506,190 B2 * | 3/2009 | Thomas et al. | ............ | 713/322 |
| 7,669,071 B2 * | 2/2010 | Cochran et al. | ............ | 713/340 |
| 7,721,561 B2 * | 5/2010 | Kim | ............ | 62/186 |
| 7,742,844 B2 * | 6/2010 | Coxe, III | ............ | 700/300 |
| 7,894,191 B2 * | 2/2011 | Tsuchiya | ............ | 361/695 |
| 7,930,388 B2 * | 4/2011 | Zhang et al. | ............ | 709/224 |
| 7,937,188 B2 * | 5/2011 | Liu et al. | ............ | 700/299 |
| 2003/0137267 A1 * | 7/2003 | Blake | ............ | 318/471 |
| 2005/0209740 A1 * | 9/2005 | Vann, Jr. | ............ | 700/300 |
| 2007/0098374 A1 * | 5/2007 | Fujiwara | ............ | 388/811 |
| 2007/0133955 A1 * | 6/2007 | Hsu et al. | ............ | 388/811 |
| 2007/0180117 A1 * | 8/2007 | Matsumoto et al. | ......... | 709/226 |
| 2007/0297893 A1 * | 12/2007 | Alon et al. | ............ | 415/47 |
| 2008/0004755 A1 * | 1/2008 | Dunstan et al. | ............ | 700/299 |
| 2008/0098354 A1 * | 4/2008 | Chen et al. | ............ | 717/120 |
| 2008/0201506 A1 * | 8/2008 | Lee | ............ | 710/100 |
| 2008/0312888 A1 * | 12/2008 | Vinson et al. | ............ | 703/2 |
| 2009/0055665 A1 * | 2/2009 | Maglione et al. | ............ | 713/320 |
| 2009/0138228 A1 * | 5/2009 | Dalton et al. | ............ | 702/130 |
| 2009/0254769 A1 * | 10/2009 | Brundridge et al. | ......... | 713/320 |

* cited by examiner

Primary Examiner — M. N. Von Buhr
(74) Attorney, Agent, or Firm — Kevin Jones

(57) ABSTRACT

A computer-implemented method for controlling temperature of a computer system is disclosed. The computer system contains multiple modules and at least one cooling fan. The method contains the steps of collecting thermal data from a first set of modules, calculating an initial fan speed, collecting thermal data from a second set of modules, and recalculating the fan speed to adjust cooling of modules to desired operating temperatures.

18 Claims, 2 Drawing Sheets

METHOD OF CONTROLLING TEMPERATURE OF A COMPUTER SYSTEM

CROSS REFERENCE TO RELATED APPLICATION(S)

This application claims priority from U.S. Provisional Application 60/942,237 filed Jun. 6, 2007 entitled "METHOD OF MONITORING AND CONTROLLING THERMALS OF A COMPUTER SYSTEM" the content of which is incorporated herein in its entirety to the extent that it is consistent with this invention and application.

BACKGROUND

Computer system components, such as central processing units (CPUs), chipset, graphics cards, and hard drives, produce large amounts of heat during operation. This heat must be dissipated in order to keep these components within safe operating temperatures. Overheated components generally exhibit a shorter life-span and may also cause malfunction of the computer system.

The risk of overheating increases with increasing density of computer system components. In a typical blade server, a large number of heat generating blades may be closely placed in a single system enclosure. Limited open space in the system enclosure results in reduced air circulation and correspondingly reduced heat dissipation.

SUMMARY

A computer-implemented method for controlling temperature of a computer system is disclosed. The method includes the steps of collecting thermal data from a first set of modules, calculating an initial fan speed, collecting thermal data from a second set of modules, and recalculating the fan speed to adjust cooling of modules to desired operating temperatures.

DESCRIPTION OF THE DRAWINGS

The detailed description will refer to the following drawings, wherein like numerals refer to like elements, and wherein.

DETAILED DESCRIPTION

Figure 1:
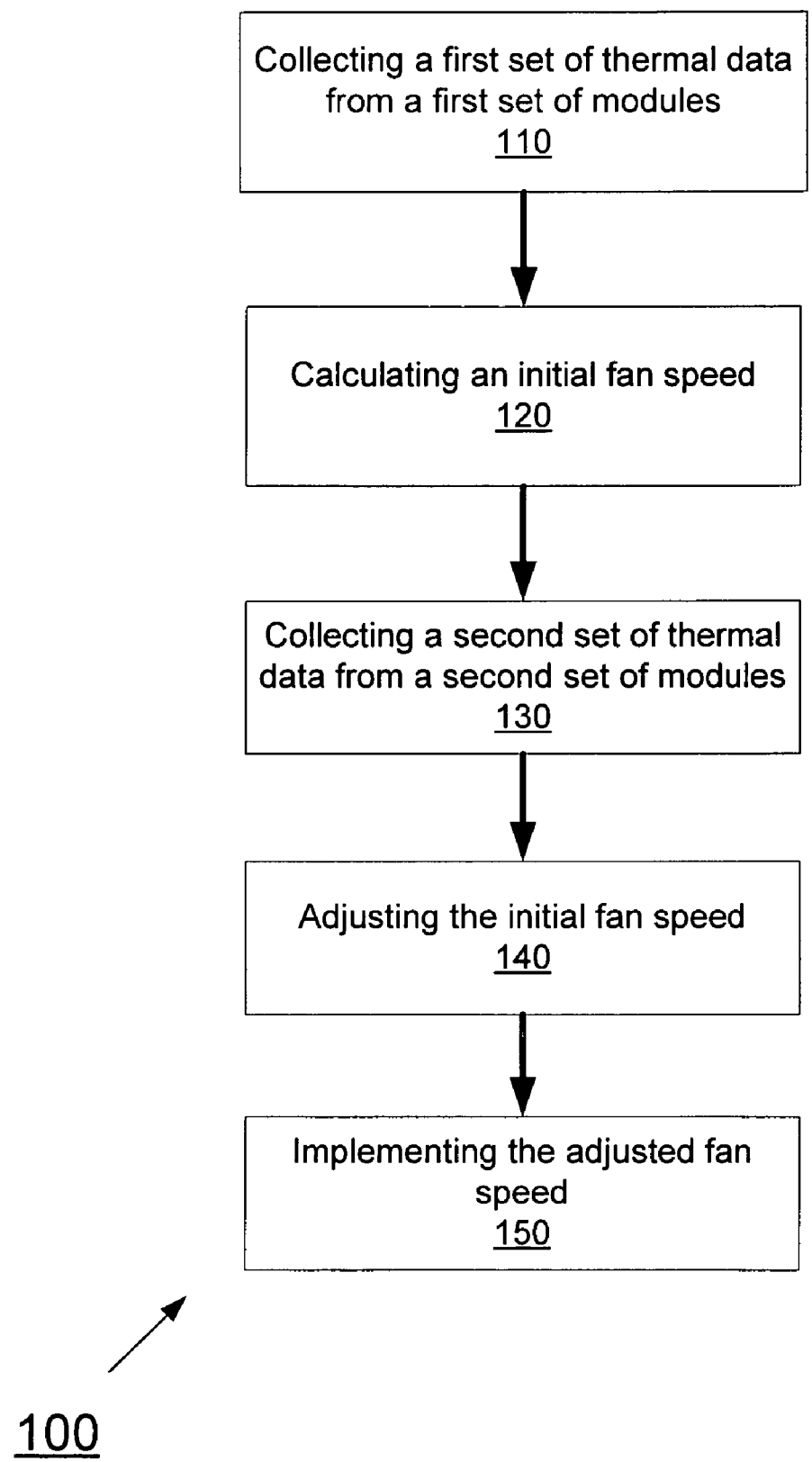
FIG. 1 is a flow diagram showing an embodiment of a method for controlling temperature of a computer system.

Described herein is a method for monitoring and controlling temperature of a computer system having multiple modules and at least one cooling fan. As shown in FIG. 1, exemplary temperature monitoring and controlling method 100 includes the steps of: collecting (110) a first set of thermal data from a first set of modules, calculating (120) an initial fan speed based on the first set of thermal data; collecting (130) a second set of thermal data from a second set of modules; adjusting (140) the initial fan speed based on the second set of thermal data, and implementing (150) the adjusted fan speed.

The thermal data includes all information relating to the thermal status of a module. Examples of thermal data include, but are not limited to, "virtual" and actual temperatures, thermal status expressed in relative terms, such as cold, warm and hot, heat generation rates, heat dissipation rates, and cooling needs expressed in terms of fan speed, such as a "virtual" fan reading. A "virtual" temperature is a temperature calculated based on one or more actual temperature readings. For example, the management processor on a module may provide a "virtual" temperature of the module based on the actual temperature reading from one or more temperature sensors in the module. Similarly, a "virtual" fan reading is a calculated fan reading for a fan that does not actually exist.

In one embodiment, the at least one cooling fan is a pulse-width modulation (PWM) fan. The first set of modules are modules that support a "virtual" PWM fan reading. A "virtual" PWM fan reading is an arbitrary "virtual" fan speed that is calculated by the management processor on a module that support such a reading based on the module's internal temperature. If the module actually had a fan, the real fan will be able to cool the module under its current load by running at the "virtual" fan speed. The second set of modules are modules that do not support a "virtual" PWM fan reading.

PWM fans are well known to those skilled in the art. The revolution speed of a PWM fan is controlled by a PWM control signal. The fan speed response to the PWM control signal is a continuous and monotonic function of the duty cycle of the signal, from 100 percent to the minimum specified revolutions per minute (RPM).

As used hereinafter, the term "PWM fan" or "fan" refers not only to fans attached to a computer chassis, but may also be intended to signify any other computer fans, such as CPU fans, graphics processing unit (GPU) fans, chipset fans, power supply unit (PSU) fans, hard disk drive (HDD) fans, or peripheral component interconnect (PCI) slot fans. PWM fans can be of various sizes and power. Common computer fans have sizes range between 40 mm to 120 mm in diameter.

Figure 2:
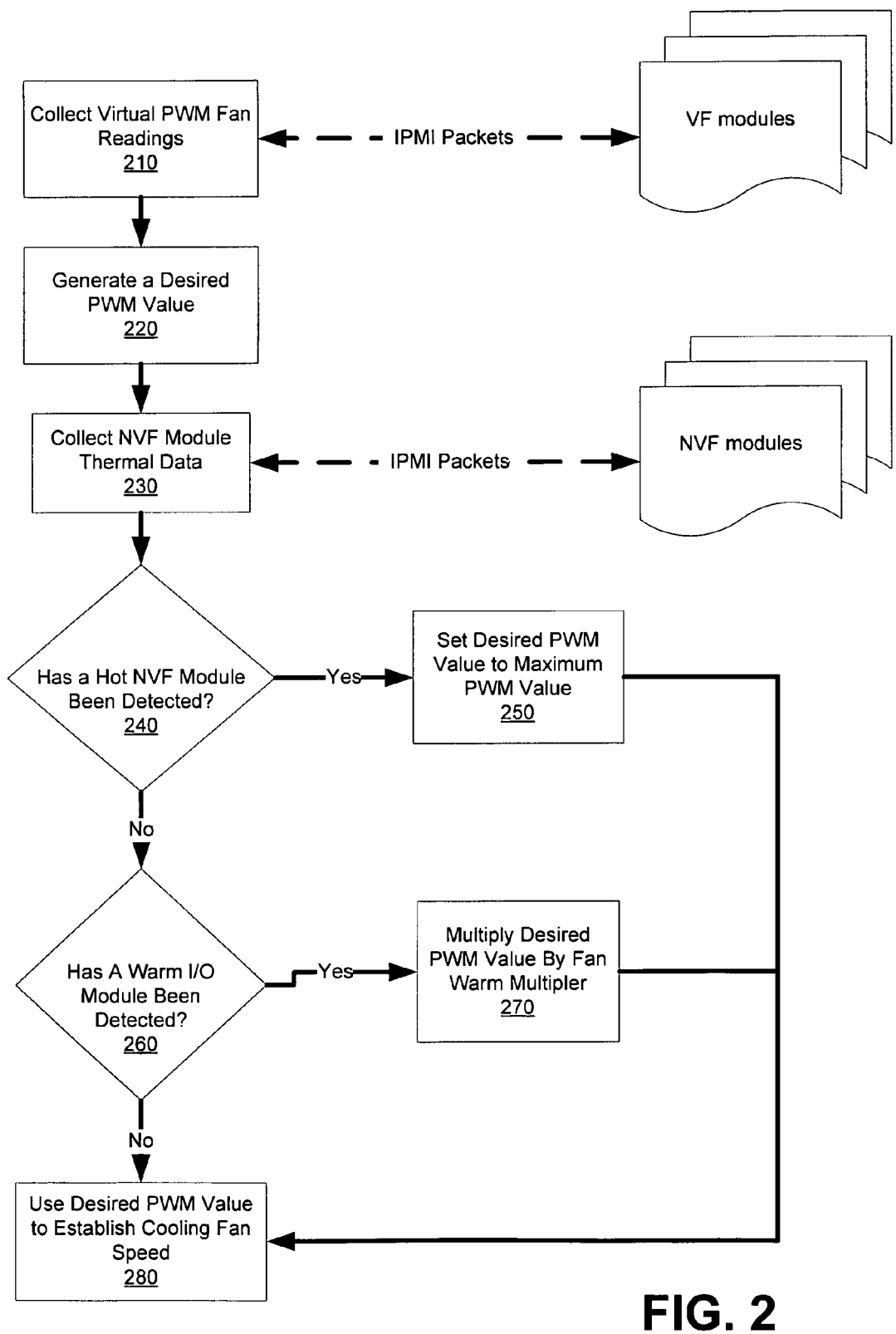
FIG. 2 is a flow diagram showing another embodiment of a method for controlling temperature of a computer system.

Referring now to FIG. 2, in the first step (210) of method 200, a control program requests a "virtual" PWM fan reading from a management processor on each module that supports such a reading. The modules that support a "virtual" PWM fan reading are designed as "virtual-fan-reading-capable modules" or "VF modules." In a VF module, the management processor on the VF module measures the actual temperature of the VF module through one or more temperature sensors in the VF module and calculates a "virtual" PWM fan reading. The management processor sends the "virtual" PWM fan reading to the control program upon request from the control program. In an embodiment, the VF modules are server blades. The "virtual" PWM fan reading for each blade server is calculated by the management processor on that blade server based on readings from the blade server's internal temperature sensors. In another embodiment, the "virtual" PWM fan reading has a value in the range of 0-255. A "virtual" fan running at "0" PWM fan reading is not spinning and a "virtual" fan running at "255" PWM fan reading is spinning at the maximum speed.

The control program interacts with the VF modules through a intelligent platform management interface (IPMI), which operates independently of the operating system (OS) and allows administrators to manage the computer system remotely even in the absence of the OS or system management software, or even if the monitored system is not powered on. The IPMI also can function when the OS has started, and offers enhanced features when used with the system management software.

The control program then generates (220) a desired PWM value based on the "virtual" PWM fan readings from all the VF modules. In an embodiment, the desired PWM value is generated using a conversion table that converts "virtual" PWM fan readings from all the VF modules into a PWM fan speed. The conversion table is system specific and is produced experimentally for each computer system.

If the computer system has a single PWM cooling fan or multiple PWM cooling fans running at the same speed, the desired PWM value is the revolution speed of the cooling fan(s). If the computer system has multiple PWM cooling fans running at different speeds, the desired PWM value is calculated for each PWM fan in the computer chassis based on the fan placement and the needs of surrounding modules. In an embodiment, the computer system is divided into several operation zones and a PWM value is calculated for each zone.

Next, the control program collects (230) thermal data of each of the modules that do not support a "virtual" PWM fan reading. These modules are designated as "non-virtual PWM fan reading modules" or "NVF modules." In an embodiment, the NVF modules are I/O modules. The thermal data of a NVF module can be provided in a variety of forms. In an embodiment, the control program has direct access to a temperature sensor on the NVF module and reads the actual temperature of the NVF module. In another embodiment, the control program does not have direct access to a temperature sensor but reads the NVF module's temperature status from a management processor on the NVF module. The control program may also interact with the VF modules through the IPMI.

The control program then compares the temperature status of each NVF module to the optimal operating temperature range of the NVF module. The optimal operating temperature range of a NVF module is typically provided by the management processor on the NVF module. Alternatively, the optimal operating temperature range of NVF modules are pre-programmed in the control program or stored in a database accessible to the control program of the computer system.

In one embodiment, a management processor on the NVF measures the temperature of the NVF module, compares the temperature of the NVF module to the optimal operating temperature range of the module, and simply presents to the control program a temperature indication relative to the optimal operating temperature, such as cool, normal, warm, hot, etc. For example, a "cool" status indicates that the module is not in use or has just been turned on. A "normal" status indicates that the module is operating within the optimal operation temperature range. A "warm" status indicates that the module's temperature is higher than the optimal operating temperature but lower than the module's critical temperature. A "hot" status indicates that the module's temperature is at or above the critical operating temperature. A module operating at or above the critical temperature is likely to fail.

If the control program determines that the temperature reading of a NVF module is not in the optimal operating temperature range for that particular module, the control program adjusts the PWM value to accommodate the needs of that particular module.

In an embodiment, the control program would modify the desired PWM value based on a predetermined multiplier. The multiplier may be determined from the number of NVF modules reporting non-optimal temperatures, and the degree to which they are outside of their optimal temperature range. For example, a "warm" NVF module may increase the desired PWM value by 10 percent, but two "warm" NVF modules may increase the desired PWM value by 30 percent, and two "hot" NVF modules may increase the desired PWM value by 60 percent.

In the embodiment shown in FIG. 2, if a "hot" temperature reading is detected (240) from a NVF module, the control program automatically sets (250) the desired PWM value to a maximum PWM fan speed. If no "hot" temperature reading is detected, but one or more "warm" NVF modules are detected (260), the control program increases (270) the desired PWM value based on the predetermined "fan warm" multiplier and uses the modified PWM value to establish (280) cooling fan speed.

In another embodiment, the control program turns off some or all "hot" NVF modules if two or more "hot" temperature reading are detected from NVF modules. The advantage of control method 200 is that all VF modules and NVF modules can be sufficiently cooled regardless of their thermal characteristics.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method for controlling temperature in a computer system comprising a plurality of blade servers and a cooling fan, the method comprising:
   collecting a first temperature indication from a first blade server;
   calculating a fan speed for the cooling fan based on the first temperature indication;
   collecting a second temperature indication from a second blade server;
   recalculating the fan speed for the cooling fan based on the first and second temperature indications such that the first and second blade servers are cooled to acceptable operating temperatures; and
   generating a signal that causes an actual speed of the cooling fan to be the recalculated fan speed.

2. The method of claim 1, wherein the at least one cooling fan comprises a pulse-width modulation (PWM) fan.

3. The method of claim 1, wherein the second temperature indication comprises an actual temperature reading collected from a temperature sensor in the second blade server.

4. The method of claim 1, wherein the second temperature indication comprises an actual temperature reading collected from a management processor of the second blade server.

5. The method of claim 1, wherein the second temperature indication indicates the second blade server's temperature status relative to an optimal operating temperature.

6. The method of claim 1, wherein the second blade server comprises an I/O module.

7. The method of claim 1, further comprising comparing the second temperature indication to an optimal operating temperature of the second blade server, and generating a temperature indicator for the second blade server.

8. The method of claim 7, wherein the fan speed is recalculated based on the temperature indicator using a predetermined multiplier.

9. The method of claim 7, wherein the optimal operating temperature is provided by a management processor in the second blade server.

10. The method of claim 7, wherein the optimal operating temperature is stored in a database.

11. The method of claim 1, wherein the computer system comprising multiple cooling fans running at the same speed.

12. The method of claim 1, wherein the computer system comprising multiple cooling fans running at different fan speed, and wherein calculating and recalculating fan speed are performed for each of the multiple cooling fans.

13. The method of claim 12, wherein said fan speed is calculated for each of the multiple cooling fans based on proximity to a particular blade server and the temperature indication of that particular blade server.

14. The method of claim 1, further comprising switching off one or more blade servers to maintain optimal operation temperatures of other blade servers.

15. A method for controlling temperature in a computer system comprising multiple blade servers and a PWM fan, the method comprising:
- collecting a first temperature indication from a first blade server;
- calculating a fan speed for the PWM fan based on the first temperature indication;
- collecting a second temperature indication from a second blade server;
- recalculating the fan speed for the PWM fan based on the first and second temperature indications using a predetermined multiplier; and
- implementing the recalculated fan speed;
- wherein the predetermined multiplier is a value such that the first and second blade servers are cooled to desired operating temperatures when the recalculated fan speed is implemented.

16. The method of claim 15, wherein the second temperature indication comprises an actual temperature reading collected from a temperature sensor in the second blade server.

17. A system comprising:
- a blade server mounted in a chassis, the blade server comprising a management processor to generate a temperature indication of the blade server;
- a first cooling fan mounted in the chassis;
- a second cooling fan mounted in the chassis; and
- a control unit coupled to the blade server and the first cooling fan, the control unit requests the temperature indication from the management processor of the blade server, determines a fan speed for each of the cooling fans based on the proximity of each of the cooling fans to the blade server and the temperature indication, and generates a signal that causes an actual speed of the first cooling fan to be the determined fan speed for the first cooling fan and generates a signal that causes an actual speed of the second cooling fan to be the determined fan speed for the second cooling fan.

18. The system of claim 17 further comprising one or more additional blade servers, wherein the control unit switches off one or more blade servers to maintain optimal operation temperatures of other blade servers.

* * * * *

UNITED STATES PATENT AND TRADEMARK OFFICE
CERTIFICATE OF CORRECTION

| | | |
|---|---|---|
| PATENT NO. | : 8,140,196 B2 | Page 1 of 1 |
| APPLICATION NO. | : 12/153124 | |
| DATED | : March 20, 2012 | |
| INVENTOR(S) | : James A. Rozzi et al. | |

It is certified that error appears in the above-identified patent and that said Letters Patent is hereby corrected as shown below:

In column 4, line 59, in Claim 11, delete "comprising" and insert -- comprises --, therefor.

In column 4, line 61, in Claim 12, delete "comprising" and insert -- comprises --, therefor.

In column 4, line 62, in Claim 12, delete "speed," and insert -- speeds, --, therefor.

In column 4, line 64, in Claim 13, delete "said" and insert -- the --, therefor.

Signed and Sealed this
First Day of January, 2013

David J. Kappos
*Director of the United States Patent and Trademark Office*